United States Patent
Wifler

(10) Patent No.: US 12,352,330 B2
(45) Date of Patent: Jul. 8, 2025

(54) MAGNETIC VIBRATION DAMPER

(71) Applicant: WifCo Inc., Crete, IL (US)

(72) Inventor: Alexander Wifler, Crete, IL (US)

(73) Assignee: WifCo Inc., Crete, IL (US)

( * ) Notice: Subject to any disclaimer, the term of this patent is extended or adjusted under 35 U.S.C. 154(b) by 0 days.

(21) Appl. No.: 18/513,150

(22) Filed: Nov. 17, 2023

(65) Prior Publication Data

US 2024/0280160 A1 Aug. 22, 2024

Related U.S. Application Data

(60) Provisional application No. 63/499,802, filed on May 3, 2023, provisional application No. 63/446,382, filed on Feb. 17, 2023.

(51) Int. Cl.
*F16F 15/03* (2006.01)

(52) U.S. Cl.
CPC ........ *F16F 15/035* (2013.01); *F16F 2222/06* (2013.01)

(58) Field of Classification Search
CPC ............................ F16F 15/035; F16F 2222/06
USPC ........................................................ 188/267
See application file for complete search history.

(56) References Cited

U.S. PATENT DOCUMENTS

| | | | | |
|---|---|---|---|---|
| 5,392,881 A * | 2/1995 | Cho | ...................... | F16F 15/035 310/15 |
| 6,405,841 B1 * | 6/2002 | Zeno | ...................... | F16F 15/03 188/267 |
| 9,457,635 B2 * | 10/2016 | Pepka | ...................... | F16F 15/03 |
| 9,687,037 B1 | 6/2017 | Colello et al. | | |
| 10,279,447 B2 * | 5/2019 | Lowth | ................ | B23Q 11/0032 |
| 10,550,910 B2 | 2/2020 | Glanzner | | |
| 11,187,477 B2 * | 11/2021 | Snyder | ...................... | F16F 15/03 |
| 2009/0236192 A1 * | 9/2009 | Takeuchi | .................. | F16F 6/00 188/267 |
| 2020/0085128 A1 | 3/2020 | Coyle et al. | | |
| 2021/0005368 A1 | 1/2021 | Breiwa et al. | | |

OTHER PUBLICATIONS

Ma, Der-Ming et al., The design of eddy-current magnet brakes, Transactions—Canadian Society of Mechanical Engineering, Mar. 2011, 20 pages.

* cited by examiner

*Primary Examiner* — Xuan Lan Nguyen

(74) *Attorney, Agent, or Firm* — Fox Rothschild LLP

(57) ABSTRACT

This document discloses a magnetic vibration dampener. The dampening device can be configured to attenuate movement of an object. The dampening device can include an electrically-conductive member, and a magnet. One of the electrically-conductive member and the magnet can be configured to be fixed to the object. The other of the electrically-conductive member and the magnet can be mounted for movement in relation to the electrically conductive member or the magnet fixed to the object. The electrically-conductive member can be positioned within a magnetic field of the magnet so that an eddy current generated within the electrically-conductive member by the magnet resists relative movement between the electrically-conductive member and the magnet.

4 Claims, 16 Drawing Sheets

MAGNETIC VIBRATION DAMPER

RELATED APPLICATIONS AND CLAIM OF PRIORITY

This patent document claims priority to U.S. Provisional Patent Application No. 63/446,382, filed Feb. 17, 2023, and U.S. Provisional Patent Application No. 63/499,802, filed May 3, 2023. The disclosures of each priority application are fully incorporated into this document by reference.

FIELD

The present disclosure generally relates to a vibration dampener.

BACKGROUND

Many different devices, tools, firearms, vehicles, etc. produce unwanted vibrations that can be, for example, transferred into a user of the particular device. As an example, when a firearm is fired, the resulting forces can cause the user to experience recoil and other movements of the firearm that can be detrimental to the shooter and make additional follow-up shots difficult. Archers are presented with similar issues, as unwanted vibrations can travel from the bow to the archer upon the shooting of an arrow. As another example, physical impacts in sports can negatively brain health of players. Concussions caused by forces experienced in the head of players are rampant among athletes of all ages, especially, for example, those playing American football.

Conventional vibration dampeners utilize rubber or other flexible materials, springs, or a combination of both to dissipate energy in the form of frictional forces, heat, etc. Such rubber dampeners are limited in the amount of vibration they can absorb for a given weight of the dampener. Thus, they either become very large and heavy, or they absorb a relatively small amount of energy. Accordingly, a lighter and more compact vibration dampener with improved dampening abilities is desirable.

SUMMARY

In another aspect, the disclosed technology relates to a dampening device configured to attenuate movement of an object. The dampening device can include an electrically-conductive member, and a magnet. One of the electrically-conductive member and the magnet can be configured to be fixed to the object. The other of the electrically-conductive member and the magnet can be mounted for movement in relation to the electrically conductive member or the magnet fixed to the object. The electrically-conductive member can be positioned within a magnetic field of the magnet so that an eddy current generated within the electrically-conductive member by the magnet resists relative movement between the electrically-conductive member and the magnet.

In some embodiments, the dampening device can further include a second magnet. The electrically-conductive member is fixed to the object, and the first and second magnets can both be mounted for movement in relation to the electrically-conductive member. The first and second magnets can be positioned to repel each other. In other embodiments, the electrically-conductive member can be fixed to the object, and the first magnet can mounted for movement in relation to the electrically-conductive member, and the second magnet can be fixed relative to the electrically-conductive member. The second magnet can be positioned such that it repels the first magnet and resets the position of the first magnet when the first magnet moves.

In some embodiments, the dampening device can further include a second electrically-conductive member positioned within a magnetic field of the magnet so that an eddy current generated within the second electrically-conductive member by the magnet resists relative movement between the second electrically-conductive member and the magnet.

In some embodiments, the dampening device can further include a second electrically-conductive member and a second magnet. The second electrically-conductive member can be positioned within a magnetic field of the second magnet so that an eddy current generated within the second electrically-conductive member by the second magnet resists relative movement between the second electrically-conductive member and the second magnet. The second magnet and second electrically conductive member can be oriented with respect to the object such that the first magnet and first electrically-conductive member resist relative movement along a different axis than the second magnet and second electrically-conductive member.

In another aspect, the disclosed technology relates to a vibration dampening device including a conductive tubular member, a first magnet disposed proximate to a proximal end of the tubular member, and a second magnet disposed proximate to a distal end of the tubular member. The first magnet can be positioned to move within the tubular member toward the second magnet. In some embodiments, the vibration dampening device can include a dielectric material disposed between the tubular member and the first magnet. In some embodiments, the vibration dampening device can include a dielectric material disposed between the tubular member and the second magnet. In some embodiments, the vibration dampening device can further include a third magnet disposed within the tubular member between the first magnet and the second magnet. The first, second, and third magnets can be positioned such that the third magnet repels both the first magnet and second magnet.

In some embodiments, the vibration dampening device can further include a housing. The tubular member, first magnet, and second magnet can be disposed within the housing. The housing may be a carbon fiber, plastic, or metal tube. The housing may further include at least one of a picatinny rail attachment, a clamp, an MLOK attachment, or a KEYMOD attachment.

In another aspect, the disclosed technology relates to a vibration dampening device including a first magnet, a second magnet, and a conductor. The first and second magnets can be positioned relative to the conductor such that a force exerted on the housing causes relative movement between at least one of the first magnet or second magnets and the conductor. The device can be configured to dissipate the force at least in part through eddy currents generated in the conductor by the movement.

In another aspect, the disclosed technology relates to a firearm recoil dampener including a housing, a first magnet, a second magnet, and a conductor. The first and second magnets can be disposed within the conductor and configured to move relative to each other and to the conductor in response to a recoil force.

In another aspect, the disclosed technology relates to a vibration dampening device including a housing, a first magnet disposed in the housing, a conductive rod extending through the first magnet, a second magnet disposed adjacent to a distal end of the rod, and a third magnet disposed adjacent to a proximal end of the rod. The first, second, and third magnets can be positioned within the housing such that the first magnet is held between the second and third magnets by repulsive forces from both the second and third magnets. In some embodiments, a spring can be disposed within the housing and at one end of the conductive rod. In some embodiments, the conductive rod can be configured to axially translate relative to the first, second, and third magnets.

In another aspect, the disclosed technology relates to a helmet including an outer shell and a vibration dampener disposed within the outer shell. The vibration dampener can include a first magnet, a second magnet, and a housing enclosing the first magnet and second magnet. The helmet can further include padding disposed on the interior of the shell. The vibration dampener can be disposed within the padding. The vibration dampener can be positioned and configured to absorb vibration generated upon an impact on the helmet. The vibration dampener can be disposed near the crown of the helmet. The vibration dampener can be disposed near the bottom of the helmet.

The vibration dampener can further include a conductor. The first magnet and second magnet can be disposed inside the conductor. In some embodiments, the vibration dampener can further include a dielectric spacer disposed between the tubular member and the first magnet. In some embodiments, the vibration dampener can further include a dielectric spacer disposed between the tubular member and the second magnet. In some embodiments, the vibration dampener can further include a third magnet disposed within the conductor between the first magnet and the second magnet. The housing can enclose the conductor.

The disclosure also relates to a firearm including one or more of the disclosed dampening devices. The disclosure also relates to a firearm accessory including one or more of the disclosed dampening devices. The disclosure also relates to an archery bow including one or more of the disclosed dampening devices. The disclosure also relates to a helmet including one or more of the disclosed dampening devices. The disclosure also relates to a power tool including one or more of the disclosed dampening devices. The disclosure also relates to a vehicle including one or more of the disclosed dampening devices. The disclosure also relates to a helmet including one or more of the disclosed dampening devices. The disclosure also relates to a wheelchair including one or more of the disclosed dampening devices. The disclosure also relates to a household appliance including one or more of the disclosed dampening devices.

BRIEF DESCRIPTION OF THE DRAWINGS

The accompanying drawings, which are incorporated herein and constitute part of this specification, are illustrative of particular embodiments of the present disclosure and do not limit the scope of the present disclosure. The drawings are not to scale and are intended for use in conjunction with the explanations in the following detailed description.

DETAILED DESCRIPTION

Figure 1:
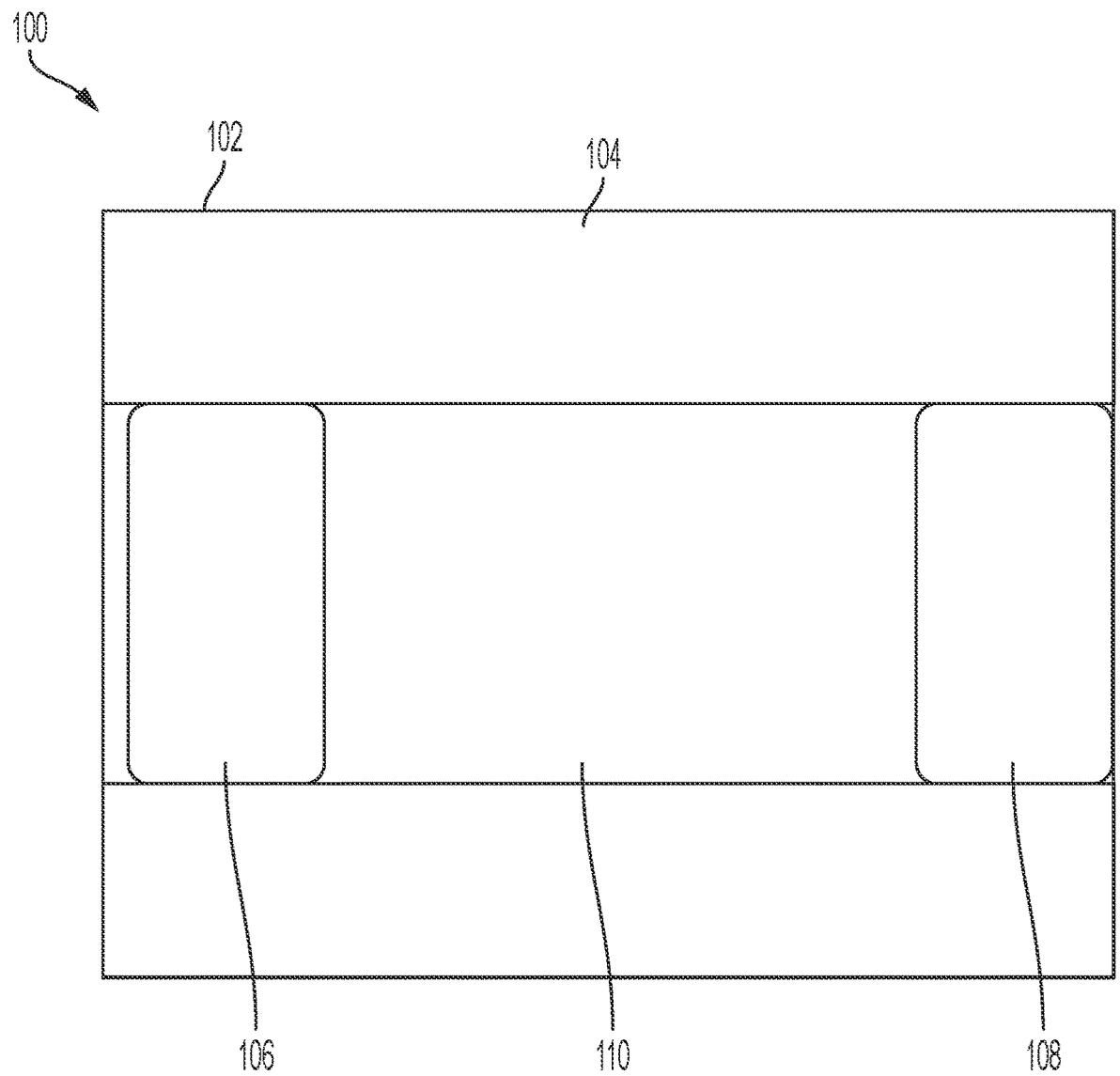
FIG. 1 is a side cross-sectional view of an example vibration dampener.

The following discussion omits or only briefly describes conventional features of the disclosed technology that are apparent to those skilled in the art. Reference to various embodiments does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. A person of ordinary skill in the art would know how to use the instant invention, in combination with routine experiments, to achieve other outcomes not specifically disclosed in the examples or the embodiments.

Unless otherwise specifically defined herein, all terms are to be given their broadest possible interpretation including meanings implied from the specification as well as meanings understood by those skilled in the art and/or as defined in dictionaries, treatises, etc. Unless defined otherwise, all technical and scientific terms used herein have the same meaning as commonly understood by one of ordinary skill in the art in the field of the disclosed technology. It must also be noted that, as used in the specification and the appended claims, the singular forms "a," "an" and "the" include plural referents unless otherwise specified, and that the terms "includes" and/or "including," when used in this specification, specify the presence of stated features, elements, and/or components, but do not preclude the presence or addition of one or more other features, steps, operations, elements, components, and/or groups thereof. Additionally, methods, equipment, and materials similar or equivalent to those described herein can also be used in the practice or testing of the disclosed technology.

Various examples of the disclosed technology are provided throughout this disclosure. The use of these examples is illustrative only, and in no way limits the scope and meaning of the invention or of any exemplified form. Likewise, the invention is not limited to any particular preferred embodiments described herein. Indeed, modifications and variations of the invention may be apparent to those skilled in the art upon reading this specification, and can be made without departing from its spirit and scope. The invention is therefore to be limited only by the terms of the claims, along with the full scope of equivalents to which the claims are entitled.

Certain relationships between features of the suppressor are described herein using the term "substantially" or "substantially equal". As used herein, the terms "substantially" and "substantially equal" indicate that the equal relationship is not a strict relationship and does not exclude functionally similar variations therefrom. Unless context or the description indicates otherwise, the use of the term "substantially" or "substantially equal" in connection with two or more described dimensions indicates that the equal relationship between the dimensions includes variations that, using mathematical and industrial principles accepted in the art (e.g., rounding, measurement or other systematic errors, manufacturing tolerances, etc.), would not vary the least significant digit of the dimensions. As used herein, the term "substantially parallel" indicates that the parallel relationship is not a strict relationship and does not exclude functionally similar variations therefrom. As used herein, the term "substantially orthogonal" indicates that the orthogonal relationship is not a strict relationship and does not exclude functionally similar variations therefrom.

The present disclosure relates to an improved vibration dampener. The vibration dampener dissipates energy in the form of electricity through the generation of eddy currents. Eddy currents are created during relative motion between a magnet and a conductor. In disclosed embodiments, kinetic energy from vibrations (or another impulse) causes the relative motion between at least one magnet and a conductor. The motion causes eddy currents in the conductor, which generate an opposing magnetic field to the field created by the magnet. This opposing magnetic field acts as a "brake," which attempts to stop the relative motion between the conductor and magnet. The result is kinetic energy being dissipated as electrical energy by the conductor. The electrical energy is harmlessly dissipated by the conductor as the eddy currents are closed loop currents within the conductor. Another small amount of energy may be dispersed as heat created by friction within the system. The magnitude of the eddy currents (or the power dissipated through the eddy currents) is proportional to the size of the magnetic field, the size of the conductor, and inversely proportional to the resistivity of the conductor and the density of the conductor. The damping force is proportional to the eddy current magnitude and velocity.

The vibration dampener can include a housing that holds one or more conductors and one or more magnets. For example, the vibration dampener housing can hold a first magnet, a second magnet, and a conductor. In other embodiments, the vibration dampener may not have a separate housing. For example, the conductor may form all or a portion of the housing and contain the one or more magnets. The first and second magnets are positioned relative to the conductor such that a force exerted on the housing causes relative movement between at least one of the first magnet or second magnet and the conductor. The dampener is configured to dissipate energy from the force through the relative movement through eddy currents generated in the conductor by the movement. The magnitude of the current generated (and the dampening effect) is proportionate to the velocity of the moving magnet.

In other words, a dampening device can be configured to attenuate movement of an object. The dampening device can include an electrically-conductive member, and a magnet. One of the electrically-conductive member and the magnet can be fixed relative to the object (e.g., so that when the object moves, either the electrically-conductive member or magnet moves with the object). The other of the electrically-conductive member and the magnet (i.e., the one not mounted such that it is fixed relative to the object) is mounted for movement in relation to the electrically conductive member or the magnet fixed to the object. Put differently either the electrically-conductive member or the magnet is fixed to the object, and whichever of the two components is not fixed is capable of moving relative to the fixed component. This permits relative motion between the electrically-conductive member and the magnet such that eddy currents are generated upon motion of the object. The electrically-conductive member is positioned within a magnetic field of the magnet so that an eddy current generated within the electrically-conductive member by the magnet resists relative movement between the electrically-conductive member and the magnet. One or more additional magnets can be added as described in greater detail below. For example, the magnet referred to above can be a first magnet, and a second magnet may be added such that it repels the first magnet. As another example, a third magnet can be added between the first and second magnets such that it repels both the first and second magnets. In some embodiments, a dampening device can include a second electrically-conductive member and a second magnet. The second electrically-conductive member can be positioned within a magnetic field of the second magnet so that an eddy current generated within the second electrically-conductive member by the second magnet resists relative movement between the second electrically-conductive member and the second magnet. The second magnet and second electrically conductive member can be oriented with respect to the object such that the first magnet and first electrically-conductive member resist relative movement along a different axis than the second magnet and second electrically-conductive member. For example, a dampening device could include a first magnet and electrically conductive member that damps motion primarily along a first axis. The dampening device could then also include second magnet and second electrically-conductive member that damp motion along a second axis that is substantially perpendicular to the first axis. The dampening device could then be mounted to, for example, damp motion in both a horizontal and a vertical direction. As a specific example, such a device could mounted to damp both recoil and vertical muzzle deviation (i.e., muzzle rise) of a firearm.

A number of different additional factors can influence the degree of dampening provided by the vibration dampener. Various parameters of the design can be tuned to provide optimal dampening for a given application. For example, the number of magnets, the relative strength of the magnets, the dimensions or size and shape of the magnets, the type of magnets, the type of conductor, the shape of the conductor, the dimensions or size of the conductor, the distance between the magnets (if multiple magnets), the distance between the magnet(s) and conductor, and the orientations of the magnets and conductor all can influence the degree of dampening provided by the vibration dampener.

Thus, the magnets used can vary in strength and size based on the particular application for the vibration dampener. Additionally, various disclosed embodiments can employ permanent magnets or electromagnets. Electromagnets can be dynamically controlled (e.g., turned on and off) in response to various inputs. For example, an electromagnetic can be tied to a switch or a trigger of a firearm or cannon. Thus, when the trigger is activated (and the firearm is fired), the electromagnet can also be activated. This may permit larger capacity magnets to be used (thus generating magnetic fields having higher magnitudes and larger dampening forces) with less weight than permanent magnets. Electromagnets can also be turned off when not in use.

Electromagnets may also be useful in other implementations, such as large buildings for earthquake dampening, vehicles, flying rockets or other flying aircraft, or others. As an example, the electromagnets could be activated when an aircraft is in flight, or when the aircraft experiences certain in flight conditions (e.g., as a result of a certain sensor input). In such an example, the dampener could be used to attenuate turbulence or recoil from aircraft mounted weapons or the like. As another example, sensors in a building could sense an earthquake or similar disturbance and active dampeners within the building. In some embodiments (whether using electromagnets, permanent magnets, or a combination thereof), a housing having electromagnetic shielding properties may be placed around the dampener. For example, the housing of the dampener itself may include magnetic shielding materials to reduce undesirable interference with other nearby metals or electronics. For example, the housing can be made from a ferromagnetic material, such as a steel or MuMetal®.

The disclosed vibration dampeners can be removably attached to another device as disclosed herein (e.g., a firearm, bow, vehicle, building, item of sporting equipment, tool, etc.). The disclosed vibration dampeners can include an attachment mechanism to attach the vibration dampener to another device. Attachment mechanisms include but are not limited to a rail clamp (such as a clamp configured to attach to a dovetail rail, Picatinny (MIL-STD-1913) rail, Weaver rail, Arca-Swiss rail), an MLOK attachment, Keymod attachment, quick-detach sling-style mount or other ball/detent attachment mechanism, a single piece or multi-piece clamp (such as a square or circular tube clamp for mounting on a firearm barrel or optic), a flange with corresponding fasteners, or combinations thereof.

Some embodiments may not include a separate attachment mechanism, but rather may be placed within another device. For example, a vibration dampener may be placed within a cavity in another device, such as a cavity within the fore end, grip, or buttstock of a gun. As further examples, a vibration dampener may be placed within a cavity within a helmet or its padding, a power tool, a handle of a manual tool, etc. The disclosed vibration dampeners can also be incorporated into firearm accessories or furniture, such as flashlights, sights, optics, fore grips, stocks, magazines, slings, holsters, bipods, tripods, shooting rests, or the like.

Therefore, as noted above, the disclosed vibration dampeners can be used in a variety of applications. One such application is on firearms to reduce felt recoil, muzzle rise, lateral muzzle movement, and recovery time between shots. Such reduction not only improves the shooter's experience (i.e., by reducing felt recoil impact on the shooter's joints), but also allows for more accurate follow-up shots with greater speed. More accurate and faster follow-up shots are possible because dampened recoil and vibration reduced the deviation of the firearm's point of aim after the shot. As used herein, a "firearm" may refer to a rifle, shotgun, pistol, or other such weapon, including semi-automatic and automatic firearms. Disclosed vibration dampeners can be scaled to various types and calibers of firearms. Disclosed embodiments are not limited to use on a certain type of firearm. For example, disclosed vibration dampeners can be used on pistols, revolvers, rifles, shotguns, muzzleloaders, and others. Disclosed vibration dampeners are also not limited to being used on a particular action type, for example, vibration dampeners can be placed on break open, bolt action, lever action, pump action, semi-automatic, automatic, etc. As a specific example, a smaller vibration dampener may be used on relatively lower caliber semi-automatic handguns or revolvers, such as 9 MM or .38 special. Relatively larger versions of the disclosed vibration dampener can be used on higher caliber rifles, such as a .308 or 7 MM. Even larger versions could be used on larger caliber rifles, such as a .50 caliber, or even 20 MM or larger cannons.

Other military implementations are possible, such as tanks, warships, helicopters, airplanes, drones, anti-aircraft guns, and the like. In such cases, vibration dampeners can have significant positive impacts on soldiers located within the vehicles that are firing large caliber shells. The recoil forces exerted on vehicles from which large caliber shells are fired can be very high, causing the vehicle, as well as the soldiers inside, to rock violently. Reducing the recoil experienced by the solider inside the vehicle not only makes their experience less unpleasant, but can also potentially reduce detrimental health effects (for example, traumatic head injuries) experienced from the shock. Further, reducing the recoil load on the vehicle and guns themselves may reduce wear on other parts of the vehicle and guns, thus increasing their durability and longevity. As described above, various parameters of the vibration dampener can be tuned to optimize performance for a particular application. Similarly, various attachment mechanisms can be implemented to attach the vibration dampener to different firearm platforms or to other devices.

Other possible applications include vehicles (such as cars, trucks, ATVs, motorcycles, airplanes, helicopters, trains, boats, rockets, amusement park rides, bicycles, scooters, dollies, forklifts, trailers (of all types including cargo trailers and livestock trailers, etc.), tractors, construction equipment, drones, and the like); medical devices (gurneys, hospital beds, wheelchairs, and the like); power tools (saws, drills, wrenches, drivers, jackhammers, chainsaws, blowers, weed trimmers, tillers, lawnmowers, and the like); non-powered handle tools (hammers, hatchets, axes, shovels, picks, and the like); sporting equipment (archery bows, baseball bats, tennis rackets, golf clubs, helmets, sticks, or the like); protective equipment (helmets, body armor, or the like) household or office appliances (washing machines, driers, dishwashers, vacuum cleaners, printers/copiers, scanners, or the like); filming equipment (cameras, gimbals, tripods, or the like); manufacturing machinery (mills, presses, lathes, molding machines, conveyors, robotic systems, and the like).

As an example, a vibration dampener can be placed on a wheelchair or hospital bed to provide a smoother ride to a hospital patient. As another example, a vibration dampener could be placed in the riser of an archery bow, or in archery bow accessories such as stabilizers or sights. As another example, to reduce felt vibration to the user after striking an object, a vibration dampener could be placed in the handle of a baseball bat, an axe, or a hammer. As yet another example, a vibration dampener could be placed in the seat or handlebars of a bicycle. Even further examples include placing a vibration dampener in a chainsaw or leaf blower to reduce transferred vibration to the user.

One specific implementation, which is described in further detail below, is in helmets for various applications, such as sports (such as football, hockey, baseball, lacrosse, equestrian, racing, winter sports, skating sports, cycling, or others), military, construction, aviation, or other applications where helmets are used to protect wearers from potentially dangerous impacts to the head. Vibration dampeners can be placed within helmets to reduce the forces experienced by the wearer during impact. In other words, the vibration dampeners will dampen the vibrations caused by an impact and reduce the potential for injury of the wearer. This is especially advantageous in some sports, for example, American football, where players often collide at high speeds and concussions (and other longer term complications such as Chronic Traumatic Encephalopathy ("CTE")) are rampant. Using disclosed embodiments to reduce head forces experienced by players can have a significant positive impact on athletes.

Even larger versions of the disclosed vibration dampeners could be used to dampen vibrations in large boats or buildings. For example, large vibration dampeners could be tuned to absorb vibrations on boats from large waves produced by storms. As another example, large vibration dampeners could be tuned to absorb vibrations on buildings from produced earthquakes.

Because of the various potential applications of the disclosed vibration dampeners, the vibration dampeners can vary greatly in size, for example from about 1 inch in length and width to several feet in length and width. As an example, a firearm dampener can be from about 1-4 inches length and about half an inch to 3 inches in width (or diameter). The internal components of the vibration dampeners can also vary in size accordingly.

EXAMPLES

The disclosed technology is next described by means of the following examples. The use of these and other examples anywhere in the specification is illustrative only, and in no way limits the scope and meaning of the invention or of any exemplified form. Likewise, the invention is not limited to any particular preferred embodiments described herein. Indeed, modifications and variations of the invention may be apparent to those skilled in the art upon reading this specification, and can be made without departing from its spirit and scope. The invention is therefore to be limited only by the terms of the claims, along with the full scope of equivalents to which the claims are entitled.

Figure 2A:
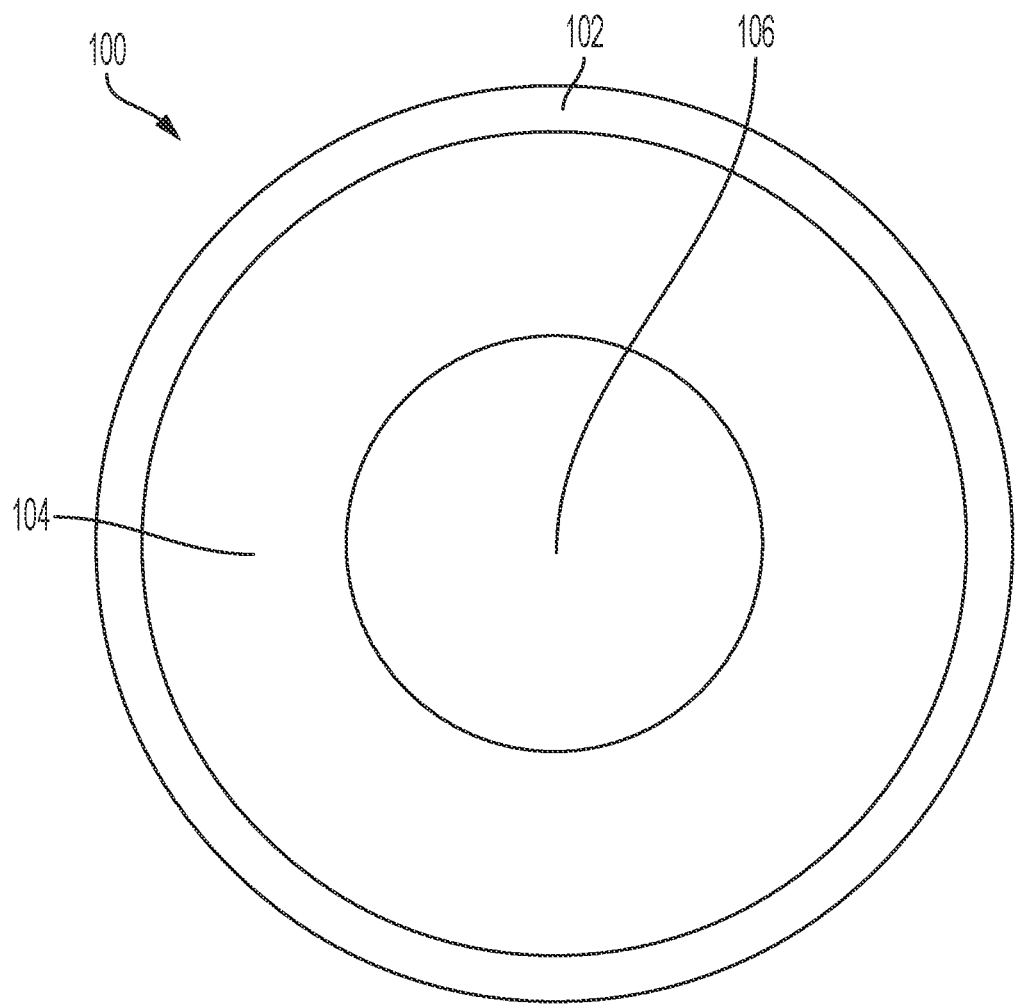
FIG. 2A is a front cross-sectional view of the vibration dampener of FIG. 1.
Figure 2B:
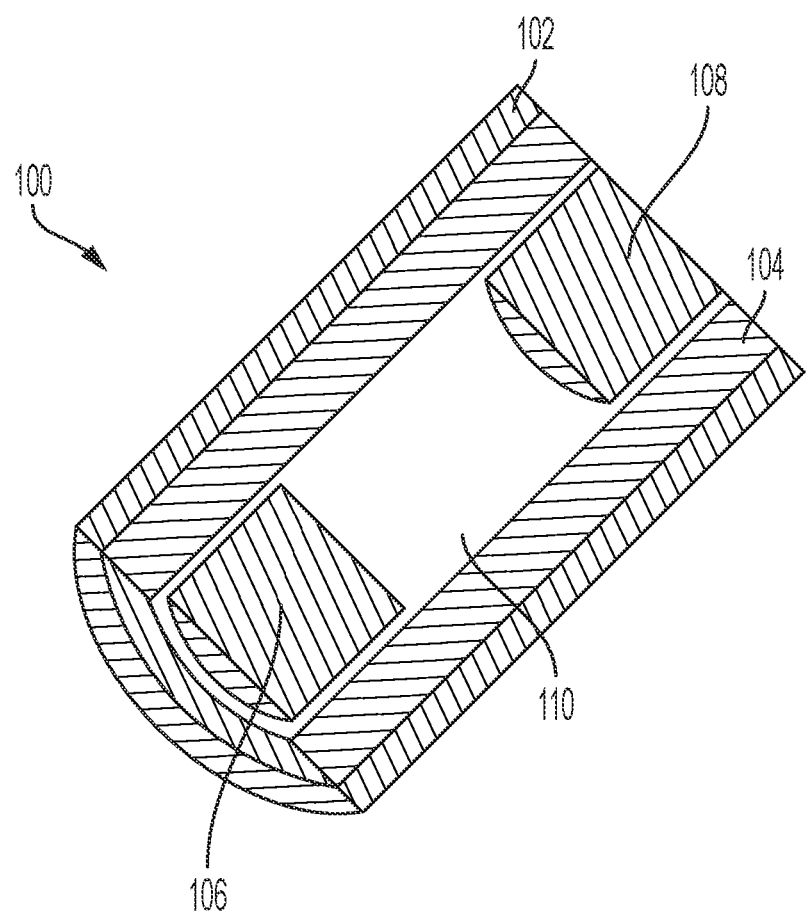
FIG. 2B is a perspective side cross-sectional view of the vibration dampener of FIG. 1.

FIG. 1 is a side cross-sectional view of an example vibration dampener 100. FIG. 2A is a front cross-sectional view of vibration dampener 100, and FIG. 2B is a side perspective cross-sectional view of vibration dampener 100. Vibration dampener 100 can include a housing 102. Housing 102 can contain other components of vibration dampener 100. Housing 102 can be constructed from a variety of suitable materials and take various shapes. For example, housing 102 can be a tube constructed of carbon fiber, aluminum, steel, plastic, or other materials. In some embodiments, smaller versions of vibration dampener 100 may include a lighter weight housing such as carbon fiber, aluminum, or plastic. Some applications may require a certain type of housing material based on the size of the dampener and the strength or other properties of the material. For example, larger dampeners may require a relatively stronger housing. Some materials (e.g., steel) may provide an additional benefit of having greater magnetic shielding properties as compared to other materials.

As shown in FIGS. 1, 2A, and 2B, vibration dampener 100 can include a conductor 104, magnets 106, 108, and a cavity 110. As shown in FIG. 2A, conductor 104 (also generally referred to herein as an electrically-conductive member) can be a hollow tube shape. Conductor 104 is a conductive material, such as a metal like copper, aluminum, silver, gold, iron, zinc, or others including alloys, etc. Accordingly, conductor 104 can also be referred to as a conductive tubular member. Vibration dampener 100 is shown with a circular cross-section, but other shapes are also possible (e.g., rectangle, square, oval, triangle, or others). Magnets 106, 108 are arranged within the cavity 110 inside of conductor 104. Specifically, first magnet 106 can be disposed proximate to proximal end of the conductor 104 and a second magnet 108 can be disposed proximate to a distal end of the conductor 104. Magnets 106, 108 are arranged such that they repel each other (i.e., either both south poles facing in (as illustrated in the example of FIG. 1) or both north poles facing in towards the center of vibration dampener 100). The magnets are also arranged so that at least one of them can move laterally (i.e., toward the other magnet) along cavity 110. In other words, the first magnetic can be positioned to move within the tubular member toward the second magnet. For example, when vibration dampener 100 is moved, magnet 106 may slide reward toward magnet 108. This movement of magnet 106 within conductor 104 will cause eddy currents to be created in conductor 104, which will in turn cause a magnetic field to slow the movement of magnet 106. The eddy currents thus cause dampening of the kinetic energy in magnet 106 and are dissipated by conductor 104.

In this case, magnet 108 serves two functions. First, magnet 108 also serves to slow the movement of magnet 106. The repulsive forces of magnet 108 will absorb some of the kinetic energy of magnet 106 and cause it to slow. Additionally, magnet 108 serves to "reset" magnet 106. In other words, the repulsive forces push the magnet 106 back to its respective end of vibration dampener 100 so that when further forces are experienced (and are to be dampened), the magnet 106 is able to again move along conductor 104 and produce eddy currents. In some embodiments, both magnets 106, 108 may be free to move within cavity 110. In other embodiments, one of the magnets 106, 108 may be fixed and the other may be free to move. Embodiments using more than two magnets are also possible. For example, in some applications requiring a higher dampening force, one or more additional magnets could be placed between magnets 106 and 108. As such, a third magnet can be disposed between the conductor 104 between magnets 106 and 108.

Some embodiments of vibration dampener 100 can include only one magnet. In such embodiments, vibration dampener 100 may include a different reset mechanism, such as a extension spring or compression spring. The spring can be configured to return the magnet to one end of cavity 110, so that the magnet can travel a greater length along conductor 104 to achieve a greater dampening effect. The spring may also bias the magnet to one end to prevent unnecessary movement of the magnet when the vibration dampener is not needed to greatly reduce vibrations. For example, without a reset mechanism, a magnet within a vibration dampener 100 attached to a firearm would freely slide around when the firearm is moved, not just when it is fired. This could cause unwanted wear on the magnet, as well as on the conductor 104 and potentially housing 102.

In some embodiments, a spacer may be included between the conductor and the one or more magnets. The spacer can be a dielectric material such as a dielectric plastic, porcelain, glass, or others. The spacer may reduce the coefficient of friction between the magnets and the conductor, which may also reduce wear on the conductor and magnets cause from repeated use over many cycles.

Further embodiments can include a housing. Conductor 104, magnet 106, and magnet 108 can be disposed within the housing. The housing can comprise a tube fitting around conductor 104 made of carbon fiber, plastic, metal, or another suitable material. FIGS. 3A, 3B, 4, and 5 described in greater detail below illustrate an embodiment of a vibration dampener having a housing.

Figure 3A:
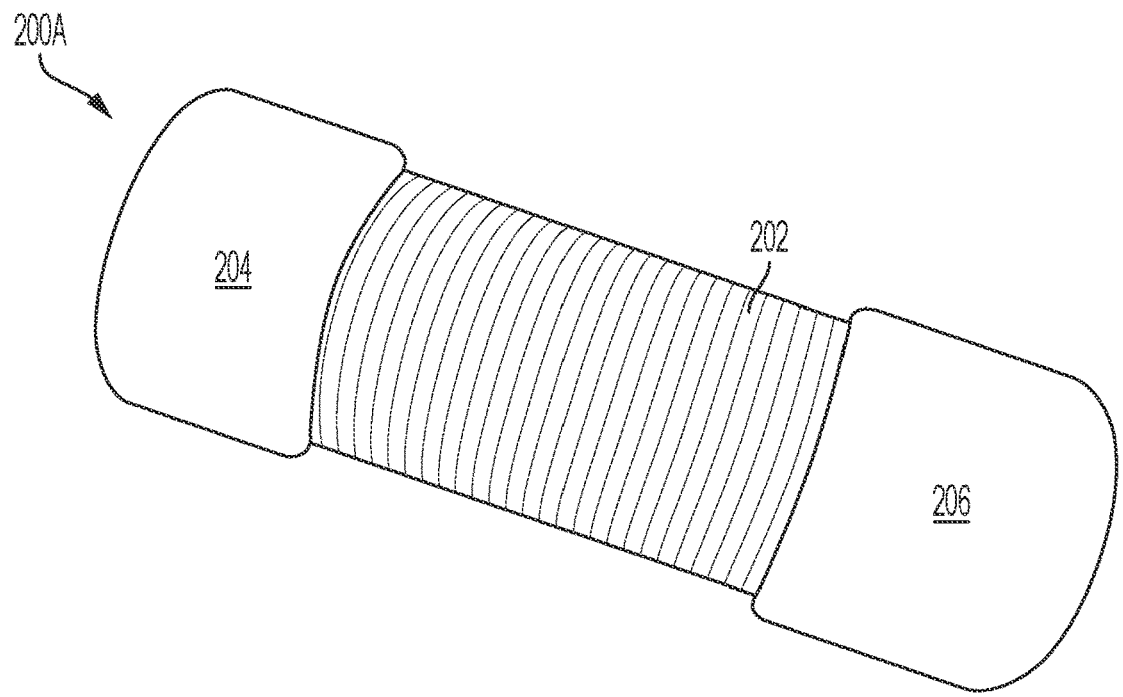
FIG. 3A is a side perspective view of another example vibration dampener.
Figure 3B:
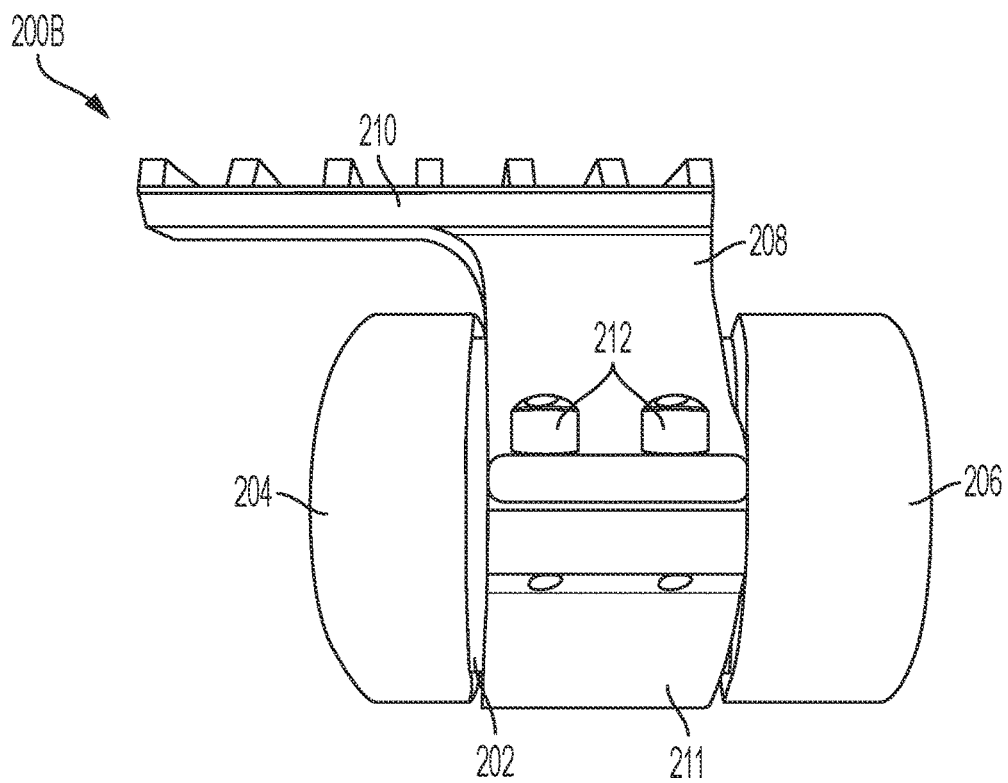
FIG. 3B is a side view of the example vibration dampener of FIG. 3A with an attachment.

FIG. 3A is a side perspective view of an example vibration dampener 200A without an attachment. FIG. 3B is a side view of a vibration dampener 200B with an attachment 208. Vibration dampener 200 can include a housing body 202, end caps 204, 206, attachment 208 having a rail 210 and a clamp 211 with fasteners 212. Attachment 208 is shown as a clamp in vibration dampener 200, but many other types of attachment are possible. Attachment 208 can vary both in the way it attaches to the housing body 202 (e.g., via clamp 211) as well as in the external attachment point (i.e., rail 210 in this example) to attach vibration dampener 200 to other devices. For example, clamp 211 can be a one piece or multi-piece clamp. While clamp 211 is depicted as using at least two fasteners (e.g., a screw, bolt, pin, rivet, etc.), a single fastener can be used. In other embodiments, a cam latch with a lever arm can be used in place of or in addition to fasteners. In some embodiments, the attachment 208 can be integrally formed into housing body 202. In yet further embodiments, attachment 208 can be glued, taped, or welded to housing body 202. In even further embodiments, attachment 208 can include a flange that is connected to housing body 202 using one or more fasteners.

Figure 4:
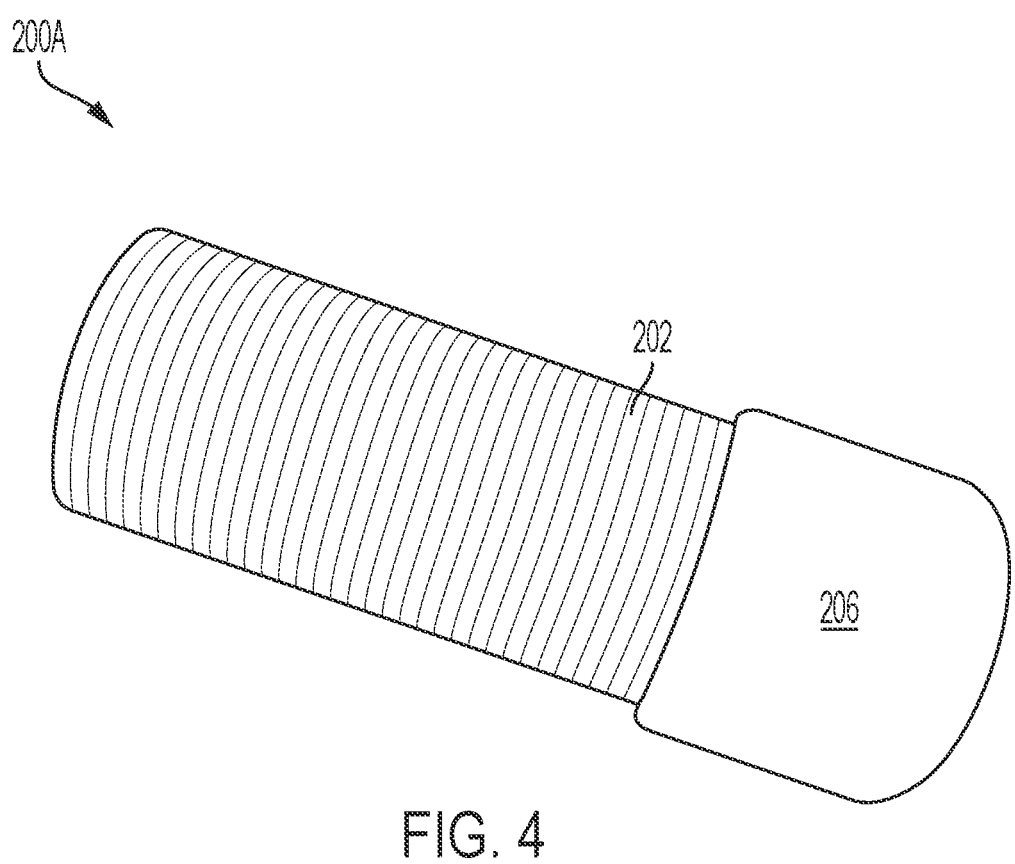
FIG. 4 is a side view of the vibration dampener of FIG. 3A with end cap and attachment removed.
Figure 5:
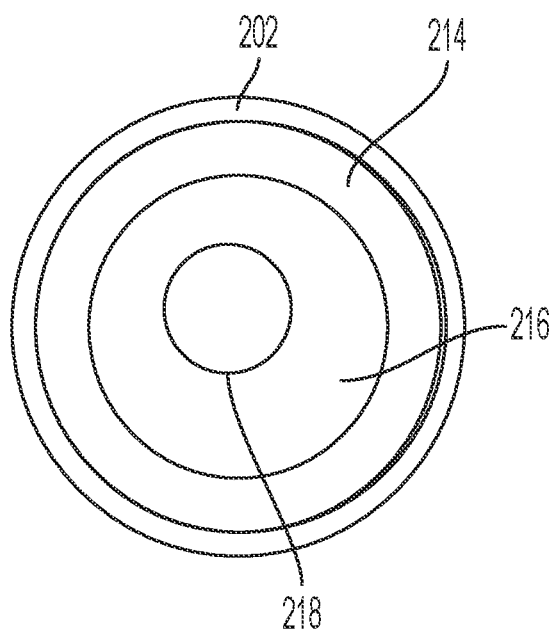
FIG. 5 is a front view of the vibration dampener of FIG. 3A with end cap and attachment removed.

FIG. 4 is a side view of vibration dampener 200A with end cap 204 and attachment 208 removed. As shown in FIG. 4, body 202 can be a cylindrical tube made of carbon fiber, plastic, metal, or a similar suitable material. End caps 204, 206 can be constructed of a rubber or plastic material and can be press fit, glued, pinned, welded, threaded, or otherwise attached to each end of body 202. FIG. 5 is a front view of vibration dampener 200 with end cap 204 and attachment 208 removed. Conductor 214 extends within body 202. Similarly, spacer 216 extends within conductor 214. Magnet 218 is placed within spacer 216 and is configured to move along the length of body 202. A second magnet (not pictured) is placed within spacer 216. The magnets act as magnets 106, 108 of vibration dampener 100 described above.

Figure 6:
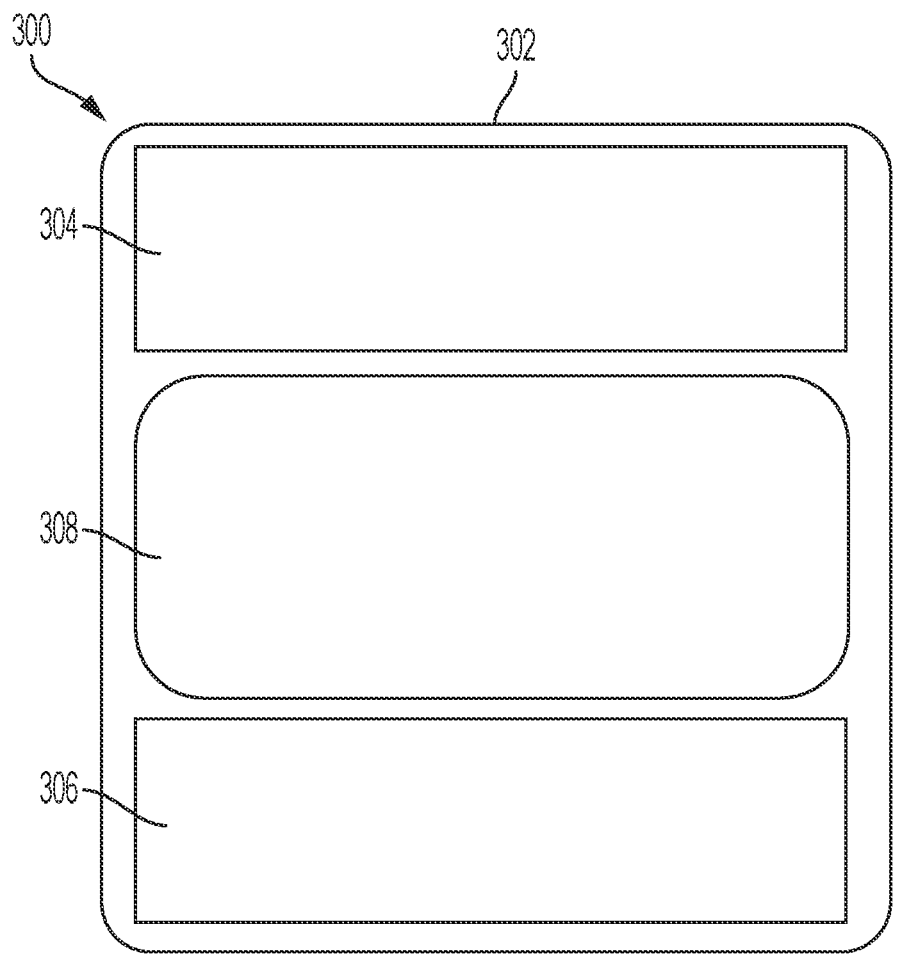
FIG. 6 is a front cross-sectional view of another example vibration dampener.

FIG. 6 is an front cross-sectional view of a vibration dampener 300. Vibration dampener 300 is similar to vibration dampeners 100, 200 described above, but differs in this cross section. Vibration dampener 300 includes conductors 304, 306 disposed within housing 302. Magnet 308 is disposed between conductors 304, 306. While not visible from this view, vibration dampener 300 can include a second magnet and function substantially the same as vibration dampeners 100, 200 described above.

Figure 7:
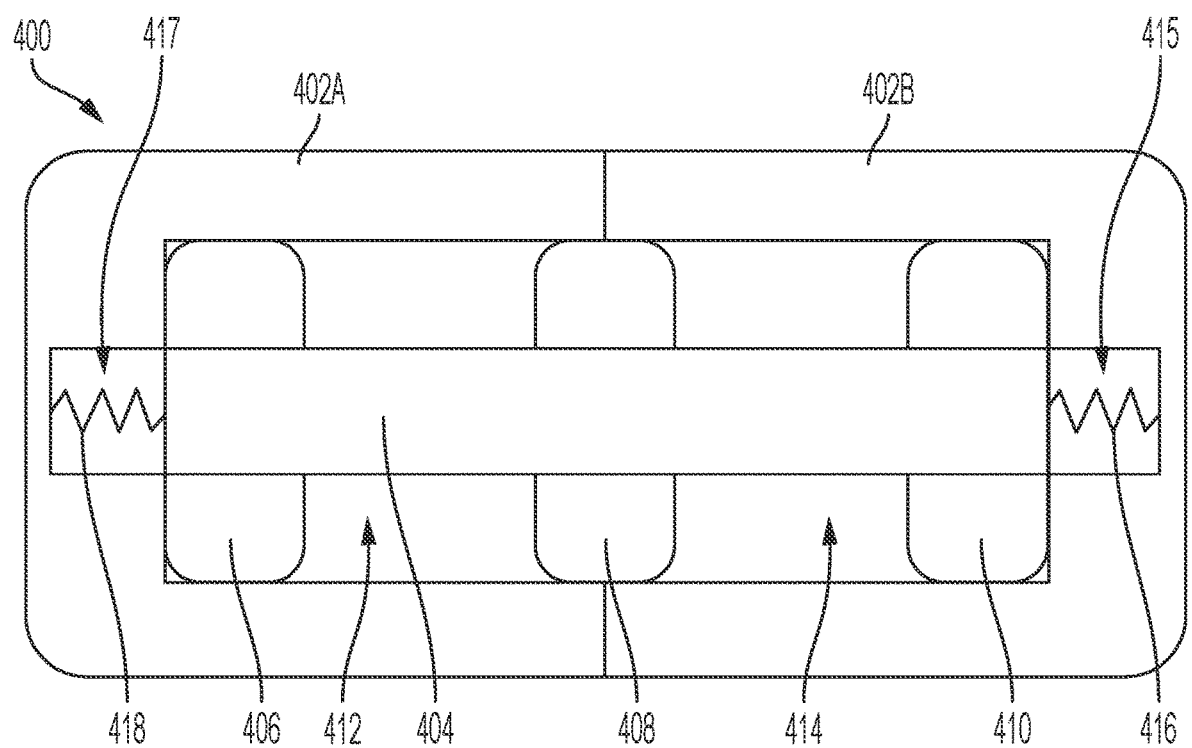
FIG. 7 is a side cross-section view of another example vibration dampener.
Figure 8:
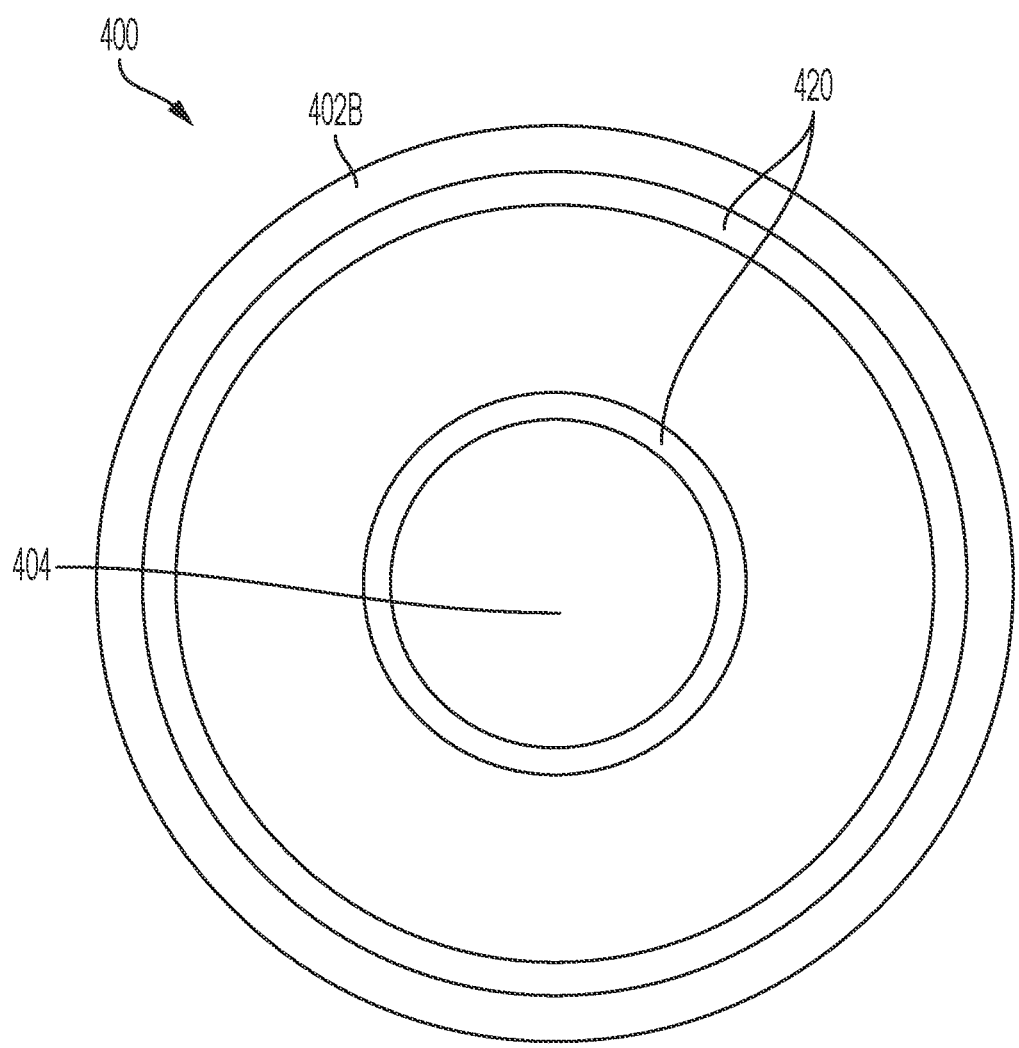
FIG. 8 is a front cross-sectional of the vibration dampener of FIG. 7.

FIG. 7 is a side cross-section view an example vibration dampener 400. Vibration dampener 400 includes a housing 402 comprising a first housing portion 402A and a second housing portion 402B. FIG. 8 is a front cross-sectional view of vibration dampener 400.

Vibration dampener 402 also includes a conductor 404 disposed within the housing 402. Magnets 406, 408, 410 are disposed around the conductor. Magnets 406, 408, 410 can be mechanically fixed in place within housing 402. Alternatively, magnets 406, 408, 410 can be arranged such that they repel each other maintain space between each other, forming cavities 412 and 414. In some embodiments, vibration dampener 402 can include more or fewer magnets. As shown in FIG. 8, a spacer 420 can be located between magnets 406, 408, 410 and housing 402, as well as between magnets 406, 408, 410 and conductor 404. Spacer 420 is not shown in FIG. 7. As described herein, spacer 420 can be a dielectric material to prevent interference with the creation of eddy currents in the conductor caused by the relative motion between the conductor and the magnets. Spacer 420 can increase the longevity of the vibration dampener by reducing wear on the other components and permitting smoother motion between the conductor and magnets.

As shown in FIGS. 7 and 8, conductor 404 can be a solid rod shape. In other embodiments, conductor 404 can be a tube with a hollow center (e.g., as conductor 104 in vibration dampener 100). Conductor 404 is constructed of a conductive material, such as a metal like copper, aluminum, silver, gold, iron, zinc, or others including alloys.

The housing 402 is configured such that there is space 415, 417 at each end of the conductor 404. Within space 415, 417 are springs 416, 418. Springs 416, 418 can be compression springs or prestretched extension springs, or similar. The springs will permit conductor 404 to slide back and forth within the housing and through magnets 406, 408, 410, while returning to a particular position. In some embodiments, first housing portion 402A and a second housing portion 402B can be adjustable relative to each other, to effectively increase or decrease the size of spaces 415, 417 (thus also increasing or decreasing the extension or compression of springs 416, 418 at rest). This adjustment can be used to fine tune the dampening ability of the system. Similar adjustment can be used in other embodiments described herein. For example, vibration dampener 100 could be constructed of a two piece housing 102, which would be adjusted to move magnets 106, 108 closer together or further apart at rest, thus changing the dampening ability of the system. Specifically, the two pieces of the housing 402A/402B can be threadably connected (e.g., 402 A having female threads and 402B having male threads or vice-versa). The threaded areas can be sufficient length to permit screwing/unscrewing of the two housing parts to shorten or lengthen the housing.

Figure 9:
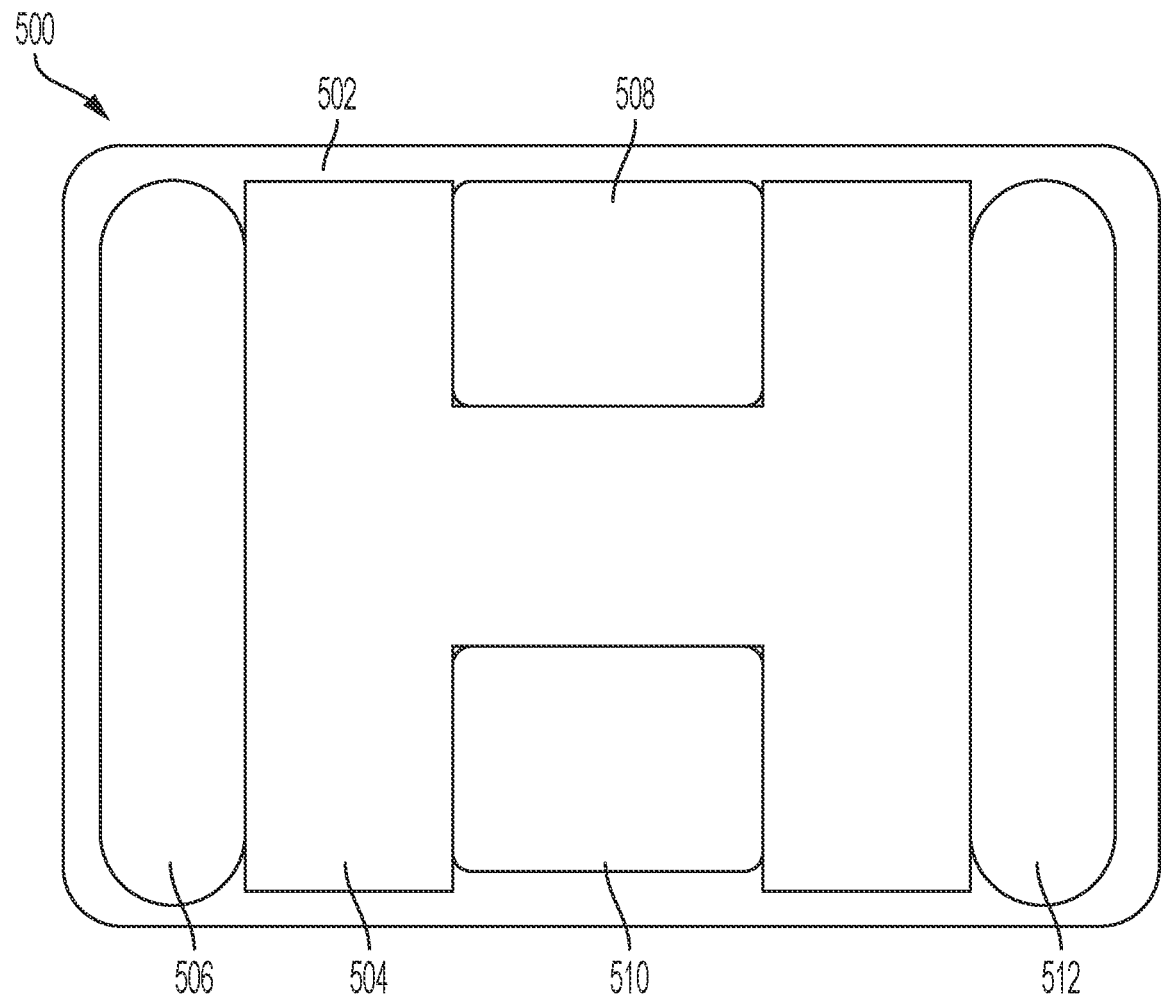
FIG. 9 is a front cross-sectional view of another example vibration dampener.

FIG. 9 is a front cross-sectional view a vibration dampener 500. This cross-sectional view is an alternative arrangement of a vibration dampener, similar to either FIG. 2 or FIG. 8. In other words, vibration dampener 500 could be constructed using a moving conductor (as in FIG. 7 and FIG. 8) or a stationary conductor with moving magnets (as in FIG. 1-5). In the first example having a moving conductor, magnets 506, 508, 510, 512 can all be stationary, while conductor 504 moves forward and backward between the magnets (e.g., as shown and described with respect to FIG. 7). In the second example, magnets 506, 508, 510, 512 can all move, while conductor 504 is stationary. In this example, one or more additional magnets corresponding to each of magnets 506, 508, 510, 512 may be present in vibration dampener 500 to "reset" magnets 506, 508, 510, 512, as described above, or provide additional dampening force.

Figure 10:
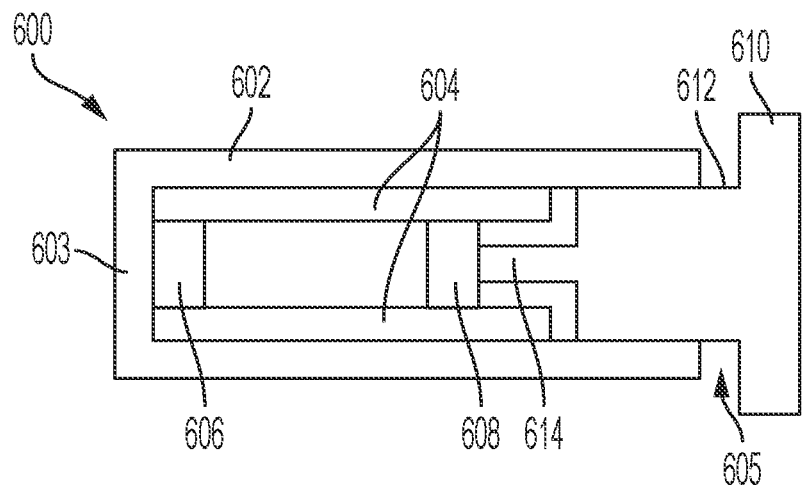
FIG. 10 is a side cross-sectional view of another example vibration dampener.

FIG. 10 is an illustration of another embodiment of an adjustable vibration dampener 600. Vibration dampener 600 has a housing 602, a conductor 604, and magnets 606, 608. The magnets 606, 608 and conductor 604 can function as described above with respect to FIGS. 1-5 and vibration dampeners 100, 200. In vibration dampener 600, one end 603 of housing 602 can be closed, while an opposing end 605 can be open. Open end 605 can receive an adjustment knob 610 having a threaded region 612 and a protrusion 614. Protrusion 614 can extend into the cavity of conductor 604 and contact magnet 608. By turning adjustment knob 610 relative to housing 602, the threads of threaded region 612 can engage corresponding threads at and near the open end 605, which can retract or advance adjustment knob 610 within the housing 602. The movement of adjustment knob 610 can cause protrusion 614 to move magnet 608 relative to magnet 606. This relative movement of the resting position of the magnets can fine tune the dampening capabilities of dampener 600 by changing the repulsive force applied between magnets 606, 608.

Figure 11A:
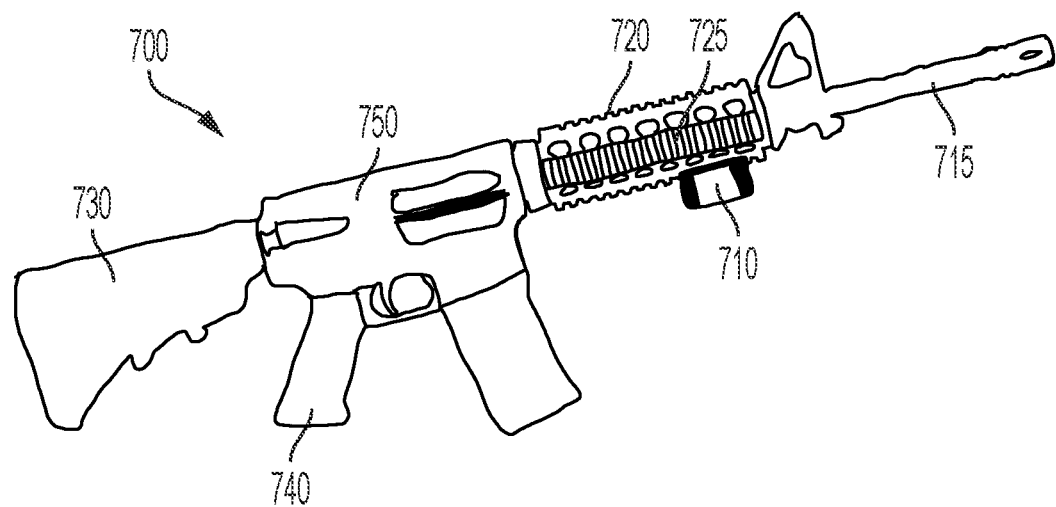
FIG. 11A is a side perspective view of a rifle with an example vibration dampener attached.

FIG. 11A is a side perspective view of a rifle 700 with vibration dampener 710 attached. As illustrated, the vibration dampener 710 can be attached to the handguard 720 of the rifle 700. Handguard 720 can take a variety of forms and have one or more rails 725, such as picatinny rails, weaver rails, ARCA rails, or the like. In some embodiments, rails may be attached to the handguard through other attachment styles, including but not limited to M-LOK and KEYMOD attachments. Vibration dampener 710 can include a clamp to attach to the rail of handguard 720. Additionally, vibration dampener 710 can include an M-LOK, KEYMOD, or other style attachment to attach directly to a handguard without the use of a separate rail. As illustrated in FIG. 11A, vibration dampener 710 can be attached on the bottom of handguard 720 in an orientation substantially parallel to the barrel of the firearm. However, other orientations and locations of attachment are possible. For example, in some embodiments, vibration dampener 710 could be placed in stock 730, placed in grip 740, or attached to receiver 750. In some embodiments of AR-15 or similar style firearms, vibration dampener 710 could be placed inside the buffer tube. Additionally, while rifle 700 is depicted as an AR-15 style rifle, it is understood that disclosed vibration dampeners can be mounted on other types of firearms, as described herein.

Figure 11B:
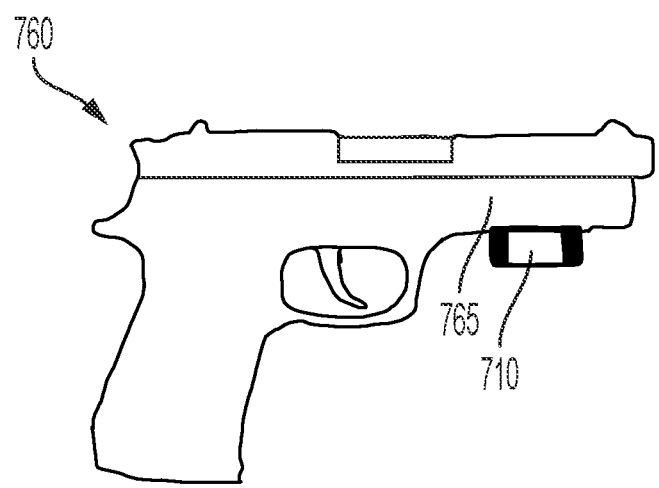
FIG. 11B is a side view of a handgun with an example vibration dampener attached.

FIG. 11B is a side view of a handgun 760 with vibration dampener 710 attached. As illustrated, the vibration dampener 710 can be attached to the frame 765 of the handgun, for example, to a picatinny or similar style rail of the frame 765. Vibration dampener 710 can be attached using a clamp that clamps to a rail of frame 765 or another portion of handgun 760. For example, a vibration dampener 710 could be placed in the bottom of a magazine (not visible in FIG. 11B) below the spring, follower, and ammunition. Additionally, a vibration dampener can be incorporated into a firearm accessory that provides another function in addition to vibration/recoil dampening, such as a light, laser, stock, rear pistol grip, foregrip, or other firearm attachment.

Figure 12:
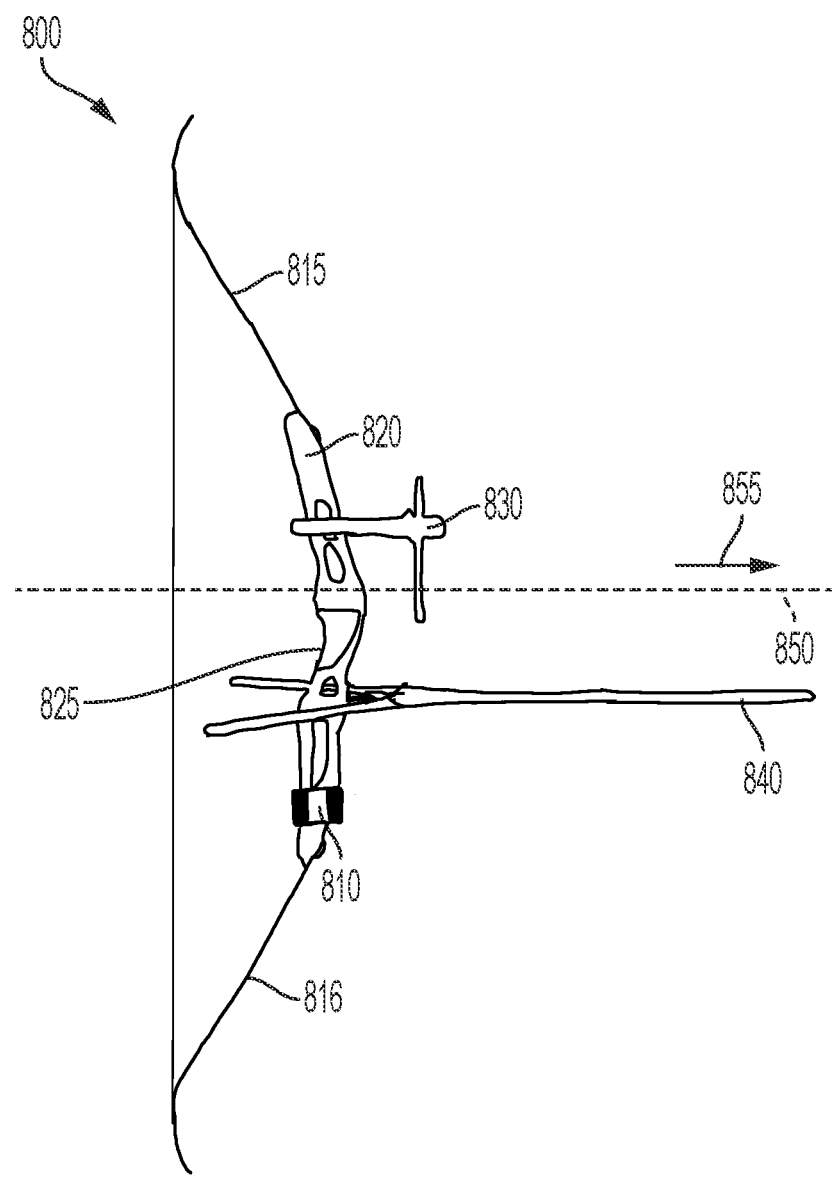
FIG. 12 is a side perspective view of an archery bow with an example vibration dampener attached.

FIG. 12 is a side perspective view of an archery bow with an example vibration dampener attached. Archery bows generate vibrations when shooting an arrow. Attaching a vibration dampener to a bow makes the bow feel better in the archer's hands, reduces sound generated by the bow when it is shot, and reduces vibration of the bow at the shot. Existing archery vibration dampeners use rubber (sometimes with or without a weight suspended in the rubber) to absorb vibration. A vibration damper will tend to increase the weight of a bow, so there is a trade-off between increased weight and decreased vibration and fatigue on a shooter. However, the magnetic vibration dampeners disclosed herein provide improved dampening capabilities. The inertia from an arrow being shot from a bow moves the bow, which can cause one or more of the magnets in the disclosed vibration dampeners to oscillate back and forth and absorb/dampen the energy. Because the invention uses the magnetic dampening described herein, the dampener can be more compact than rubber and weight-based solutions.

The archery bow 800 can comprise a riser 820 comprising a grip location 825. A first limb 815 is supported by the riser 820 and attached by a first limb fastener, which engages a first threaded cavity. A second limb 816 is supported by the riser and attached by a second limb fastener, which engages a second threaded cavity.

Vibration dampener 810 can be installed on bow 800 and take a variety of forms according to any of the vibration dampeners described herein. Vibration dampener 810 is illustrated as being located near the bottom of riser 820. However, vibration dampener 810 can be placed in other locations on riser 820 or bow 800. For example, a vibration dampener 810 could be placed at any or all of the following locations: higher on riser 820, on stabilizers 840, on sight 830. Vibration dampener 810 can be attached in a variety of ways as described herein, for example, using a clamp or bracket with a hole for a fastener. In the latter example, the fastener can extend through the hole and be attached to a part of bow 800 (e.g., riser 820).

Additionally, vibration dampener 810 is depicted as having the axis of movement of the magnet(s) of vibration dampener 810 as substantially parallel to the path of the arrow (i.e., the arrow would travel along axis 850 in direction 855). However, vibration dampeners 810 can be oriented such that the axis of the vibration dampener 810 is substantially orthogonal to the path of the arrow shot. While the vibration dampener 810 is shown in a particular location on bow 800, it is understood that it can be placed almost anywhere on the bow where they can be fixedly attached.

Figure 13A:
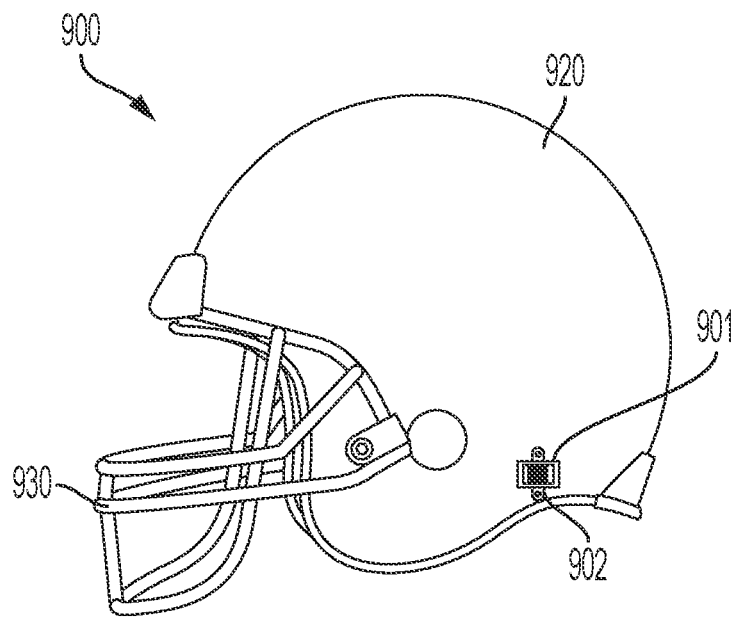
FIG. 13A is a side view of an example football helmet with an example vibration dampener attached.
Figure 13B:
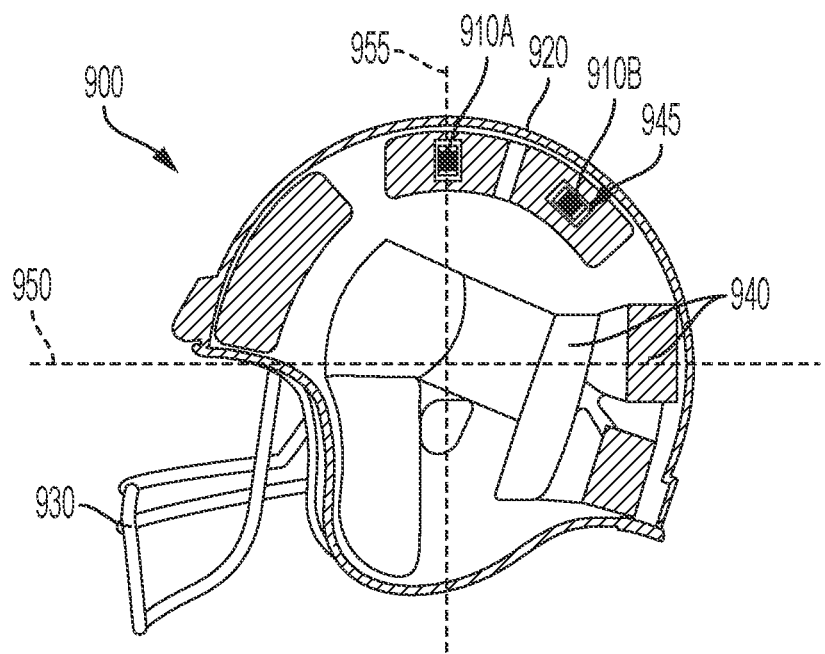
FIG. 13B is a side view of an example football helmet with example vibration dampeners installed.

FIG. 13A is a side view of a football helmet 900 with an example vibration dampener attached. While the FIGS. 13A and 13B depict a football helmet, it is understood that the described principles apply to other types and styles of helmets. Other types and styles of helmets can be used with disclosed embodiments to dampen vibration and reduce likelihood of head injuries. Helmet 900 can include a shell 920 and facemask 930. In some embodiments, a vibration dampener 901 (according to any of the vibration dampeners described herein) can be installed on an outer portion of helmet, for example on shell 920 or facemask 930. A clamp 902 with flanges can be used to attach vibration dampener 901 to helmet 900. For example, fasteners can be used to attach the flanges of clamp 902 to helmet 900. Similarly, vibration dampener 901 could be clamped to facemask 930.

FIG. 13B is a cross-sectional side view of a football helmet with example vibration dampeners installed inside. Helmet 900 can include padding 940 disposed on the interior of shell 920. One or more pieces of padding 940 can include a cavity 945 sized and shaped to receive a vibration dampener 910A/910B. Vibration dampeners 910A/910B can take a variety of forms according to any of the vibration dampeners described herein. As illustrated, vibration dampeners 910A/910B can be oriented in different directions with respect to helmet 900. For example, one or more of vibration dampeners 910A/910B can be oriented vertically with respect to helmet 900 (i.e., substantially parallel to vertical axis 955 extending through the crown of the helmet) as illustrated by vibration dampener 910A. Vibration dampeners oriented in this manner may especially help dampen vibration and protect athletes in the case of impacts to or around the crown (top) of the helmet 900. Vibration dampeners can also be oriented horizontally with respect to helmet 900 (i.e., substantially parallel to horizontal axis 950). Horizontal axis 950 can extend perpendicular to vertical axis 955. Vibration dampeners oriented in this manner may especially help dampen vibration and protect athletes in the case of head-on collisions (e.g., collisions with the front of the helmet 900 near or around facemask 930. In other cases, vibration dampeners can be oriented at an angle relative to axes 950, 955 (as in vibration dampener 910B). These various orientations apply not only to internally mounted vibration dampeners (as shown in FIG. 13B), but also to externally mounted vibration dampeners (as shown in FIG. 13A).

Figure 14:
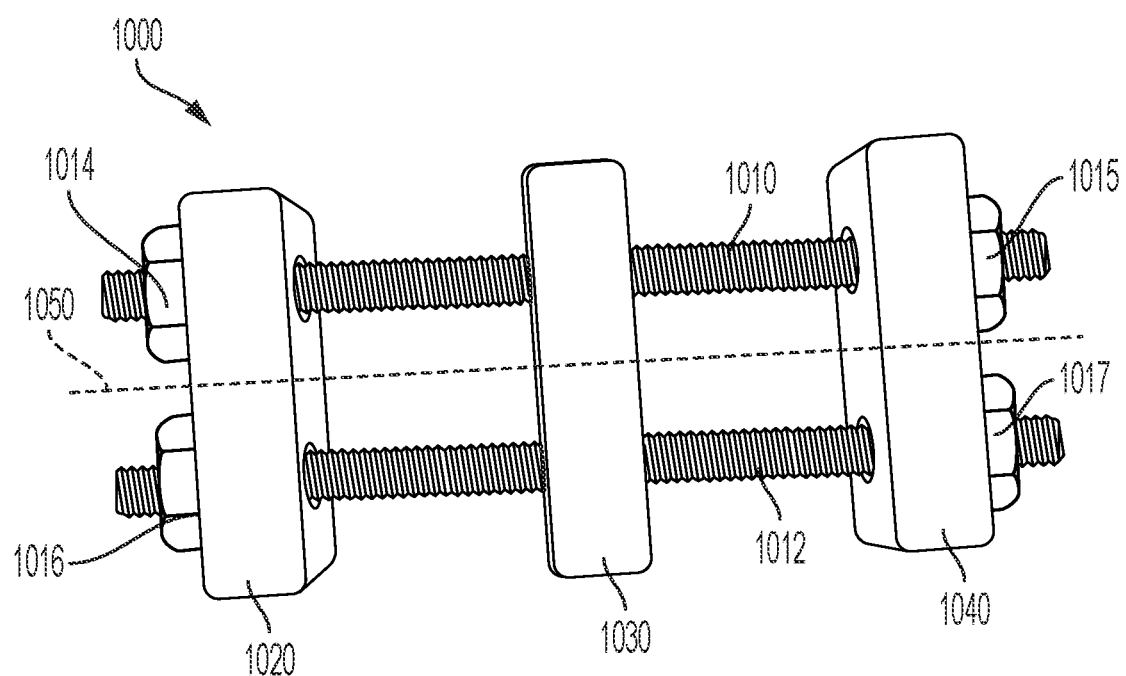
FIG. 14 is a side view of view of another example vibration dampener.

FIG. 14 illustrates another example of a vibration dampener 1000. Vibration dampener 1000 includes axles 1010, 1012 and magnets 1020, 1030, and 1040. The three magnets can be oriented such that each of the outer magnets 1020, 1040 both repel the inner magnet 1030. For example, in the view of FIG. 14, left magnet 1020 can have its positive pole on the right side and its negative pole on the left side. The center magnet 1030 can have its positive pole on the left and its negative pole on the right. The right magnet 1040 can have its negative pole on the right and its positive pole on the left. Although not shown in FIG. 1, each magnet can have holes through which axles 1010, 1012 slidably extend. Configured and constructed in this manner, the center magnet 14 essentially "floats" between magnets 12 and 16 along the axis 1050, and dampens the effect of movement of anything to which the dampener is attached. The axles 1010, 1012 keep the magnets aligned along the center axis 1050. The magnets are situated such that polarity of the two adjacent magnet "faces" are the same so that they repel each other. In other words, the magnets are positioned such that either both south pole faces or both north pole faces are facing each other than thus repel each other. In the embodiments, there are three magnets, with one on either end of the axle and one in the center, and the magnets are oriented so that the south pole of the magnet on one end is directly across from the south pole of the center magnet (so they repel each other) and the north pole of the other end magnet is oriented so its north pole is directly across from the north pole of the center magnet (also so they repel each other), which puts the center magnet in an essentially suspended state between them. The suspended magnet in the middle moves back and forth to cancel out high and low vibration, thus dampening it. In some embodiments, the magnets can be rubber coated to quiet them and to provide additional vibration dampening capabilities.

The ends of each axles can include stops 1014, 1015, 1016, 1017, which can take various forms. For example, axles 1010, 1012 can be threaded rods (as illustrated in FIG. 14) and stops 1014, 1015, 1016, 1017 can be nuts. In other embodiments, stops 1014, 1015, 1016, 1017 can be shaft collars, ferrules, pins, or other stops to prevent magnets 1020, 1040 from sliding off the axles 1010, 1012. In some embodiments, the three magnets 1020, 1030, and 1040, along with the axles 1010, 1012, can be placed within a housing (not pictured). In other embodiments, one or more of the axles 1010, 1012 can be fixed to an object without a housing.

It is contemplated that there is no limit to the number of magnets that can be used as long as there are at least two so that their poles can be aligned to repel each other. Further, a two axle version is shown, but more axles can be used if desired. In some embodiments, one axle can be used.

While the various examples illustrated in this disclosure show the movement path of the magnet or magnets within a vibration dampener as being substantially parallel to the major axis of the vibration dampener (i.e., along its length), in some embodiments, the path of motion may be positioned at a non-parallel angle to the longest dimension of the vibration dampener. In other embodiments, the housing can be mounted on another device at various angles relative to the device. For example, while the vibration dampener 710 is mounted substantially parallel to the barrel 715 of rifle 700 in FIG. 11A, vibration dampener 710 could be mounted at angle to dampen vibration on multiple axes relative to the barrel 715 of rifle 700. Additionally, or alternatively, multiple vibration dampeners can be mounted on a device to dampen vibration along multiple different axes.

Applicant has conducted several tests of some embodiments of the disclosed vibration dampeners (specifically with a design corresponding to the example dampener shown in FIGS. 1-2B) on different firearm platforms. A MantisX™ motion tracking system was attached to the firearms to record data related to recoil, muzzle rise, and recovery time between shots. Three different firearms (a CZ P10™ 9 MM handgun, a 5.56×45 mm AR-15 style rifle, and a shotgun) were fired with the MantisX™ system attached. A baseline was established by firing each firearms without a vibration dampener attached. Then, the vibration dampener was attached and the firearms were fired again. The MantisX™ system was used to capture indicative of the vibration dampener's performance. A summary of the data is outlined below. Muzzle rise is defined by the MantisX™ system as the peak angular rise of the gun after the shot. Recovery time is defined by the MantisX™ as the time for the gun to return stable to the original point of aim. Recoil angle is defined by the MantisX™ as the angle to the left or right that the gun moved as it recoiled upward. Recoil width is defined by the MantisX™ as the width of the loop formed by the upward and downward movement of the gun.

The first round of tests were conducted using the 9 MM handgun with a vibration dampener of a design of that illustrated by FIG. 1 above. The results are summarized in Table 1 below:

TABLE 1

| Measurement | Without Dampener | With Dampener | Percent Improvement |
|---|---|---|---|
| Recovery Time (s) | 0.23 | 0.03 | 87% |
| Muzzle Rise Degree | 22.74 | 17.03 | 25% |
| Recoil Width Degree | 7.31 | 2.89 | 60% |
| Recoil Angle Degree | 6.18 | 5.44 | 12% |

As the data illustrates, the vibration dampener significantly reduced the recoil of the 9 MM handgun. This reduction is especially evidence by the 87% improvement in recovery, meaning that the shooter can fire accurate follow-up shots much more quickly than without the dampener installed. Brief similar tests were conducted using a 12 gauge shotgun and a 5.56×45 MM AR-15 style rifle. The tests for the shotgun and rifle exhibited similar improvements in recovery time of 89% and 62%, respectively. The rifle also noted a muzzle rise degree improvement of 19%.

Applicant has also conducted several tests on football helmets with a prototype vibration dampener installed (with a design corresponding to the example dampener shown in FIGS. 1-2B). The tests were drop tests in which the helmet was dropped from a consistent height on various portions of the helmet (e.g., the crown, the front, the back, etc.). The acceleration/deceleration, impact force, and various other metrics were recorded and plotted. A summary of select results of some portions of the helmet are included below in Tables 2-4. As indicated the strike energy as the helmet initially hit the testing pad was measured in Joules and the resultant acceleration (of the impact and subsequent movement after 0.02 seconds). The severity index is a standardized measurement (by the National Operating Committee on Standards for Athletic Equipment ("NOCSAE")) of a helmet's ability to reduce impact forces to the head that measures acceleration over time. The severity index is a threshold score used to evaluate the safety of helmets. A lower score is better, although once below a threshold value, does not necessarily mean that probability of head injuries will be reduced. As can be seen below, the presence of the dampener can significantly decrease the severity of impacts. Further the location and orientation of the dampener can affect the level of improvement (for example, with the orientation of the dampeners, a greater improvement is seen with front and back impacts than with side impacts). However, these differences can be attenuated by adding more dampeners and/or strategically positioning and orienting the dampeners.

TABLE 2

Front Strike

| Measurement | Without Dampener | With Dampener | Percent Improvement |
|---|---|---|---|
| Strike Energy (J) | 109.3 | 109.3 | n/a |
| Resultant Acceleration (G) | 102.4 | 88.1 | 14.0% |
| Severity Index | 482 | 390 | 19.1% |

TABLE 3

Right Side Strike

| Measurement | Without Dampener | With Dampener | Percent Improvement |
|---|---|---|---|
| Strike Energy (J) | 109.7 | 109.3 | n/a |
| Resultant Acceleration (G) | 107.5 | 98.1 | 8.7% |
| Severity Index | 384 | 348 | 9.4% |

TABLE 4

Rear Strike

| Measurement | Without Dampener | With Dampener | Percent Improvement |
|---|---|---|---|
| Strike Energy (J) | 109.5 | 110.2 | n/a |
| Resultant Acceleration (G) | 100.6 | 87.3 | 13.2% |
| Severity Index | 453 | 361 | 20.3% |

Figure 15:
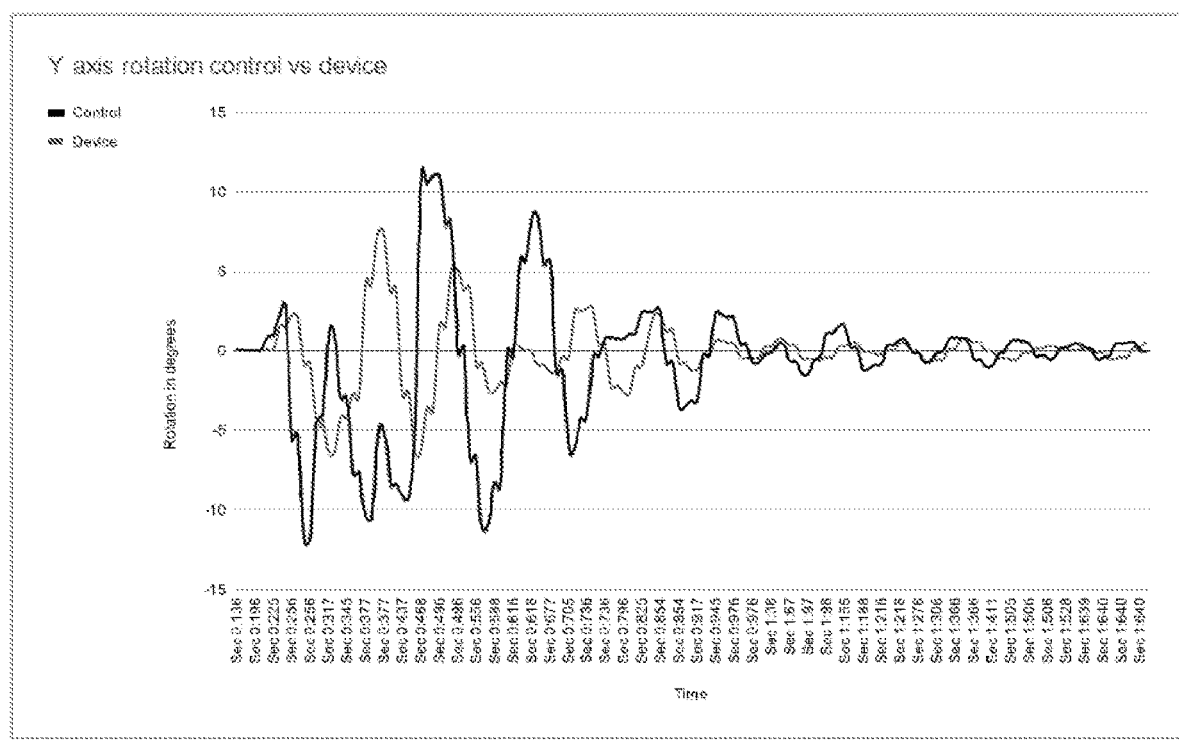
FIG. 15 is a graph illustrating sample test data of testing of an example vibration dampener.

Applicant has conducted further controlled tests of the disclosed dampeners (specifically with a design corresponding to the example dampener shown in FIGS. 1-2B) in a test environment designed to similar brain movement. These tests were conducted in a setup that includes an accelerometer attached to a mass. The mass was suspended in a housing by two springs. The springs were oriented horizontally and attached on opposite sides of the mass. An impact force was applied to the housing and the acceleration of the suspended mass was recorded. The impact force was applied approximately along an axis running through the center of both springs and the mass. A dampening device was then attached to the exterior of the housing and the test was repeated. The major axis of the dampening device (i.e., the axis of movement of the magnets) was aligned substantially parallel to the axis through the center of both springs and the mass. Various tests resulted in approximately a 25% improvement in recovery time and a 30% improvement in reducing maximum acceleration (in G-force) experienced by the mass, as well as a significant reduction in the distance traveled and rotation of the mass. FIG. 15 is a graph illustrating a comparison of the rotation of the device about the Y-axis (perpendicular to the line of force). The graph shows an improvement in dampening even in the direction not aligned with the dampener.

The foregoing merely illustrates the principles of the disclosure. Any examples set forth in this specification are not intended to be limiting and merely set forth some of the many possible embodiments for the appended claims. Those skilled in the art will readily recognize various modifications and changes that may be made without following the example embodiments and applications illustrated and described herein, and without departing from the true spirit and scope of the following claims.

All references cited and/or discussed in this specification are incorporated herein by reference in their entireties and to the same extent as if each reference was individually incorporated by reference.

What is claimed is:

1. A dampening device comprising:
   a first magnet;
   a second magnet;
   a conductor;
   a first end cap; and
   a second end cap;
   wherein the first and second magnets are positioned relative to the conductor such that a force exerted on the device causes relative movement between 1) at least one of the first magnet and the second magnet and 2) the conductor;
   wherein the device is configured to dissipate the force at least in part through eddy currents generated in the conductor by the movement;
   wherein the first and second magnets are enclosed within the conductor,
   wherein the conductor comprises a first end that is fully enclosed by the first end cap and a second end that is fully enclosed by the second end cap, and
   wherein each of the magnets contained within the electrical conductor is isolated from direct mechanical contact from any other object other than the conductor, the first end cap, the second end cap, and any other magnets within the conductor.

2. The dampening device of claim 1, wherein the first and second magnets are positioned to repel each other.

3. The dampening device of claim 1, wherein the second magnet is fixed relative to the conductor.

4. The dampening device of claim 3, wherein the second magnet is positioned such that it repels the first magnet and resets the position of the first magnet when the first magnet moves.

* * * * *